Z. SCHULTES.
PACKING RING.
APPLICATION FILED JAN. 2, 1917.
1,267,124.
Patented May 21, 1918.
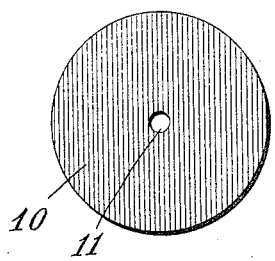
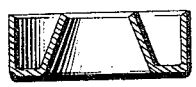
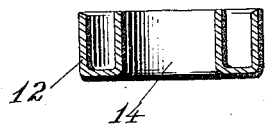
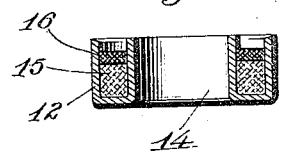
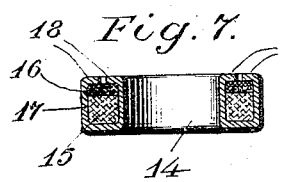
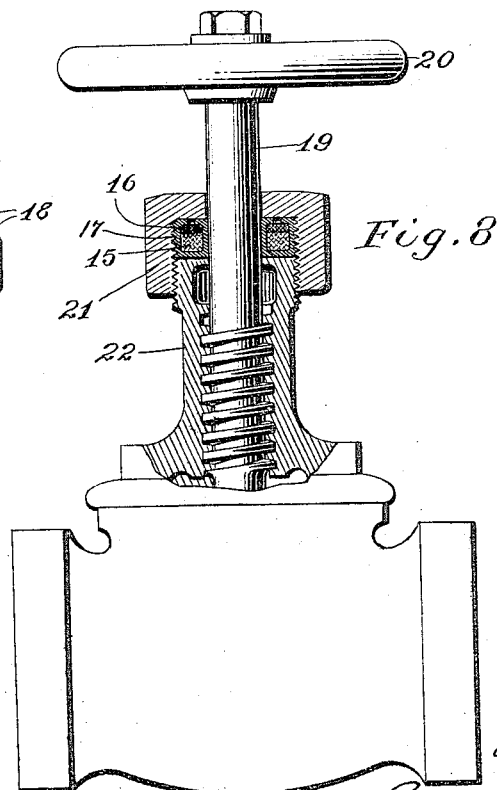
WITNESS
William P. Jones
INVENTOR
Zeno Schultes
BY
Conrad A. Dieterich
ATTORNEY

UNITED STATES PATENT OFFICE.

ZENO SCHULTES, OF NEW BRUNSWICK, NEW JERSEY.

PACKING-RING.

1,267,124.　　　　Specification of Letters Patent.　　Patented May 21, 1918.

Application filed January 2, 1917. Serial No. 140,130.

*To all whom it may concern:*

Be it known that I, ZENO SCHULTES, a citizen of the United States, residing at New Brunswick, Middlesex county, in the State of New Jersey, have invented certain new and useful Improvements in Packing-Rings, of which the following is a full, clear, and exact specification.

This invention relates to improvements in packing rings and the process of making the same, and has for its object to provide a packing ring particularly adapted for use in the stuffing-boxes or waste nuts of valves.

Further, the invention has for its object to provide a compressible packing ring whereby when the waste nut has been screwed down upon the valve bonnet the packing ring will be compressed and forced into engagement with the valve parts to form a fluid-tight joint.

Further, the invention has for its object to provide a packing ring of sufficient compressibility to adapt itself to any recesses which may be formed in the walls of the space in which it is positioned and to fill the threads of the waste-nut when the latter has been screwed into position upon the valve bonnet.

Further, the invention has for its object to provide a packing ring consisting of a hollow annular casing formed of soft metal provided with a filling comprising a layer of compressible material and a superposed layer of less compressible material.

Other objects will in part be obvious, and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawings illustrating a packing ring embodying the invention and the process of making the same—

Figure 1 represents a disk of metal from which the hollow annular casing is formed;

Figs. 2, 3, 4 and 5 are sectional views illustrating successive steps in the preliminary formation of the annular casing;

Fig. 6 is a sectional view showing the filling material in position;

Fig. 7 is a sectional view of the completed packing ring, and

Fig. 8 is a part sectional view of a valve with the packing ring positioned therein.

Referring to the drawings 10 indicates a disk having a central aperture 11, the disk being stamped or punched from a sheet of any suitable soft metal, such, for example, as an alloy of lead and antimony. By means of a series of dies, the disk 10 is pressed into a hollow annular form 12 as shown in Fig. 5, having an annular recess and a central opening 14 to receive the spindle of a valve. In illustrating the process of forming the annular member 12 from the disk 10, four successive steps are indicated, (see Figs. 2, 3, 4 and 5) each of which steps necessitates the use of separate dies, but it will, of course, be understood that the number and shape of the dies employed, and therefore the number of steps, may be varied without departing from the spirit of the invention.

After the hollow annular member 12 shown in Fig. 5 has been formed as above described, it is partially filled with asbestos or the like as indicated in Fig. 6. The filling consists of an inner layer of compressible material 15, such as asbestos, and an outer layer of less compressible material 16, such as compressed asbestos fiber.

When the filling material has been positioned within the hollow annular member 12, the formation of the casing 17 of the packing ring is completed by pressing the upper portions of the outer and inner walls of the annular member inwardly and downwardly into engagement with the upper surface of the outer layer of less compressible material as indicated at 18 in Fig. 7.

In use the packing ring is slipped upon the valve spindle 19, the handle 20 and waste nut 21 having first been removed, after which the waste nut 21 and handle 20 are placed in position. As the waste nut 21 is screwed down upon the bonnet 22 the packing ring will be subjected to pressure as a result of which it will be compressed. Owing to this compressing action the soft metal casing of the packing ring will be forced into intimate engagement with the valve spindle 19 and into the screw threads of the waste nut 21, as shown in Fig. 8 of the drawing.

Furthermore as the casing of the packing ring is compressed it will adapt itself to any recess or unevenness which may be present in the valve bonnet 22 or in the waste nut 21.

As the fibrous material constituting the upper layer of the filling is less compressible than the fibrous material constituting the lower layer thereof, it will not change its shape when the packing ring is subjected to pressure and consequently the compressible material will be of uniform thickness throughout and will not be exposed to the deteriorating action of the steam or other fluid.

It will therefore be understood that when the packing ring is in position a tight joint will be formed with the several parts of the valve, thus effectually preventing the escape of steam or other fluid in connection with which the valve is used. Furthermore, the packing ring will not become hard during use but will retain its elasticity thereby, guaranteeing its use during a long period of service and rendering it unnecessary to renew the packing at frequent intervals as is necessary with the packing now in general use.

If the packing ring is to be used in connection with a valve of that type in which the valve handle cannot be removed from the spindle, the packing ring may be cut diametrically into two halves in the usual manner.

Having thus described my said invention what I claim and desire to secure by Letters Patent is:—

1. A packing ring comprising a hollow, annular, soft metal casing consisting of a bottom wall, side walls extending upwardly therefrom, and annular portions extending inwardly from the upper edges of said side walls, and a filling within said casing consisting of compressible material spaced from said inwardly extending annular portions, and non-metallic material of less compressibility than said compressible material positioned between said compressible material and said annular portions, substantially as specified.

2. A packing ring comprising a hollow, annular, soft metal casing consisting of a bottom wall, side walls extending upwardly therefrom, and annular portions extending inwardly from the upper edges of said side walls, and a filling within said casing consisting of compressible fibrous material spaced from said inwardly extending annular portions, and fibrous material of less compressibility than said compressible material positioned between said compressible material and said annular portions, substantially as specified.

Signed at the city of New York, in the county and State of New York, this 12th day of December, one thousand nine hundred and sixteen.

ZENO SCHULTES.

Witnesses:
CONRAD A. DIETERICH,
WILLIAM P. JONES.

Copies of this patent may be obtained for five cents each, by addressing the "Commissioner of Patents, Washington, D. C."